Oct. 11, 1927.
V. M. WILSON
1,645,269
CLUTCH FOR SPRING MOTORS
Filed Feb. 16, 1926
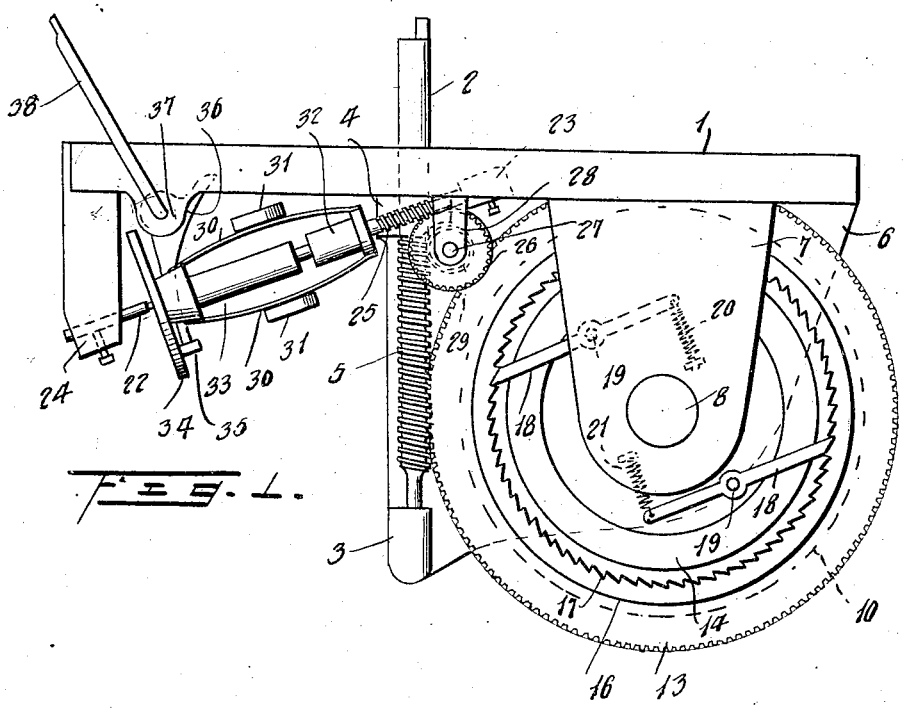
Fig. 1.
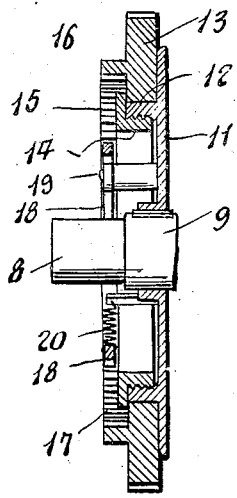
Fig. 2.
Inventor
V. M. Wilson.
By 
Attorney Patented Oct. 11, 1927.

1,645,269

UNITED STATES PATENT OFFICE.

VERNON M. WILSON, OF BENKELMAN, NEBRASKA.

CLUTCH FOR SPRING MOTORS.

Application filed February 16, 1926. Serial No. 88,600.

This invention relates to a spring motor for driving the bowl supporting spindle of a cream separator and has for one of its objects to provide the motor with a clutch which will permit it to be stopped without the sudden stopping of the motion of the bowl and without damage or injury to the means by which the driving connection between the motor and spindle is established.

With the foregoing and other objects in view, the invention consists of the novel construction, combination and arrangement of parts hereinafter fully described and claimed, and illustrated in the accompanying drawing, wherein:

Figure 1 is a view in side elevation illustrating the application of the spring motor, and Figure 2 is a sectional view of the gear by which the spring motor is connected to the bowl supporting spindle of a cream separator.

Corresponding and like parts are referred to in the following description, and in both views of the drawing, by similar reference characters.

In the drawing, 1 designates the table and 2 the bowl supporting spindle of a cream separator. The spindle 2 is supported by bearings 3 and 4 and is provided with a worm 5. The bearings 3 and 4 are carried by a bracket 6 which is secured to and depends from the table 1. This bearing bracket and a bearing bracket 7, which latter is also secured to and depends from the table 1, support the arbor 8 of a spring motor which may be of any well known or appropriate construction and which includes, in addition to the arbor 8, a sleeve 9 supported on the arbor and actuated by a spring within the spring drum 10. A disk 11 is secured at its center to the sleeve 9 and is provided at its outer face with an annular flange 12 which is smaller in diameter than and arranged concentrically with respect to the disk. A ring worm gear 13 is loosely mounted on the flange 12 and meshes with the worm 5. A ring nut 14 is arranged within and has threaded engagement with the flange 12 and is provided with an outwardly directed flange which contacts with the outer side of the gear 13 and holds it in place on the flange. The gear 13 is provided at its outer face with a concentrically arranged annular flange 16 which is provided at its inner side with ratchet teeth 17. Pawls 18 pivoted intermediate their ends as at 19 on the disk 11 engage the ratchet teeth 17. The pawls 18 are located at opposite sides of the arbor 8 and are yieldingly held in engagement with the ratchet teeth 17 by springs 20 which are secured to the pawls and to lugs 21 carried by the disk 11.

In practice, the spring motor will be equipped with a suitable brake, and when the brake is retracted the spring motor will rotate the spindle 2 through the gear 13 and worm 5. The driving connection between the gear 13 and the sleeve 9 of the spring motor is established through the medium of the disk 11 and pawls 18. When the spring motor is stopped by reason of the application of the brake, the gear 13 continues its motion due to its own inertia and the inertia of the bowl and spindle 2. It will thus be seen that the bowl will gradually come to rest and that no damage to the gear 13 and worm 5 can occur as the result of the stopping of the spring motor.

The speed of the spindle 2 is regulated by a governor which comprises a shaft 22 journaled in bearing brackets 23 and 24 secured to the under side of the table 1. The shaft 22 is provided with a worm 25 which meshes with a worm gear 26. This gear is fixed to a shaft 27 journaled in bearing brackets 28 carried by the under side of the table 1, and also fixed to this shaft is a worm gear 29 which meshes with the worm 5 of the spindle 2. The governor also includes springs 30 which are provided with weights 31 and are secured to a sleeve 32 fixed to the shaft 22 and a sleeve 33 loose on the shaft and carrying a disk 34. Contacting with the disk 34 is a brake roller 35 carried by a brake arm 36 which is pivoted to bearing brackets 37 secured to and depending from the table 1 and to which a lever 38 is secured. The speed of the governor shaft 22 and consequently the speed of the bowl supporting spindle 2 can be regulated through the medium of the disk 34, roller 35 and lever 38, and any suitable means may be employed to exert the desired yielding pressure upon the lever 38 to cause the bowl supporting spindle 2 to rotate at the desired rate.

It should be understood that the drawing is merely illustrative and does not pretend to give exact proportions. Furthermore, the said drawing is illustrative of a preferred construction, it being my expectation that various changes and modifications may be made without departing from the spirit and scope of the invention.

What is claimed is:—

In combination, the shaft of a motor, a disk secured to the shaft, an annular flange smaller diametrically than and projecting laterally from the disk and provided on the inner side thereof with screw threads, a ring gear loosely mounted on the flange, a ring nut arranged within and engaging the flange and provided with an outwardly directed flange contacting with the outer side of the ring gear, a ratchet ring projecting from the ring gear laterally beyond the flanges of the disk and ring nut and spring pressed pawls pivoted to the disk within the flange of the latter and engaging the ratchet ring.

In testimony whereof I affix my signature.

VERNON M. WILSON.